(12) United States Patent  
Adams

(10) Patent No.: US 8,666,836 B2  
(45) Date of Patent: Mar. 4, 2014

(54) TARGETING ITEMS TO A USER OF A SOCIAL NETWORKING SYSTEM BASED ON A PREDICTED EVENT FOR THE USER

(75) Inventor: Paul Adams, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/327,677

(22) Filed: Dec. 15, 2011

(65) Prior Publication Data

US 2013/0159132 A1    Jun. 20, 2013

(51) Int. Cl.
G06Q 30/00    (2012.01)

(52) U.S. Cl.
USPC .......................................... 705/26.1; 705/27.1

(58) Field of Classification Search
USPC ..................... 705/26, 27, 26.1, 27.1
See application file for complete search history.

(56) References Cited

U.S. PATENT DOCUMENTS

| | | | |
|---|---|---|---|
| 2004/0024719 | A1 | 2/2004 | Adar et al. |
| 2007/0004385 | A1 | 1/2007 | Horvitz et al. |
| 2007/0121843 | A1 | 5/2007 | Atazky et al. |
| 2007/0162458 | A1 | 7/2007 | Fasciano |
| 2008/0243531 | A1 | 10/2008 | Hyder et al. |
| 2010/0324941 | A1 | 12/2010 | Stevenson et al. |
| 2012/0016817 | A1 | 1/2012 | Smith et al. |
| 2012/0041822 | A1* | 2/2012 | Landry et al. ............... 705/14.58 |
| 2012/0150743 | A1* | 6/2012 | Isaacson et al. ................ 705/44 |

OTHER PUBLICATIONS

Web Personal Assistant; Giving Gifts Gets Smarter, Faster and Easier With Webgiftr, Anonymous. Telecommunications Weekly (Nov. 26, 2008): 294, downloaded from ProQuest Direct on the Internet on Feb. 9, 2013, 2 pages.*

Giving Gifts Gets Smarter, Faster and Easier With Webgiftr, Anonymous. Business Wire [New York] Nov. 12, 2008. Downloaded from ProQuest Direct on the Internet on Feb. 9, 2013, 2 pages.*

Convio Introduces New Personal Outreach Tools, Helps Nonprofits Leverage Online Social Networks to Empower Supporters, Business Wire [New York] Nov. 15, 2006: n/a. Downloaded from ProQuest Direct on the Internet on Feb. 9, 2013, 2 pages.*

Novelty drives market for virtual gifts, Irvine, Martha. Ocala Star—Banner [Ocala, Fla] Dec. 4, 2007. Downloaded from ProQuest Direct on the Internet on Feb. 9, 2013, 2 pages.*

U.S. Office Action, U.S. Appl. No. 12/839,350, Apr. 16, 2013, twenty-one pages.

U.S. Office Action, U.S. Appl. No. 12/839,350, Sep. 6, 2012, eighteen pages.

U.S. Appl. No. 13/732,322, filed Dec. 31, 2012, Inventor Paul Adams.

* cited by examiner

Primary Examiner — James Zurita

(74) Attorney, Agent, or Firm — Fenwick & West LLP

(57) ABSTRACT

A social networking system predicts a life event (e.g., birthday, change in marital status, relationship status, etc.) for a target user based on information associated with the user. The social networking system identifies gift suggestions to provide to one or more friends of the user based on the predicted event. A gift suggestion may include an invitation to purchase or send an item, voucher, or other gift to the target user, wherein the gift may be determined based on information about the target user's interests obtained by the social networking system. The social networking system sends a gift suggestion to one or more friends of the target user, where the gift suggestion identifies the predicted life event and provides the gift suggestion to the target user's friend. The advertisement may require action by multiple of the target user's friends before the gift is sent to the target user.

22 Claims, 4 Drawing Sheets

TARGETING ITEMS TO A USER OF A SOCIAL NETWORKING SYSTEM BASED ON A PREDICTED EVENT FOR THE USER

BACKGROUND

This invention relates generally to social networking, and more specifically to using the data contained within a social network to target items to a social networking system user based on a predicted event associated with the user.

Social networks, or social utilities that track and enable connections between users (including people, businesses, and other entities), have become prevalent in recent years. In particular, social networking systems allow users to share public and private information with other users, including information about significant events in the users' lives. These significant events may include changes in marital status, birthdays, new jobs, the birth of new children, graduation, or death, just to name a few. One way for users to share such event information is to add or update the information on their user profile. A user profile contains user provided information such as marital status, birthday, graduation date, and/or other user-specific data. Other users can then review the shared information by browsing user profiles or searching for profiles including specific data.

Social networking systems typically use the user-provided profile information to present additional information that may be relevant to the users. For example, information related to an entry level job placement may not be generally relevant to most users of the social networking system; however, the information is likely more relevant to a recent college or high school graduate. Thus users of the social networking system, or external parties such as advertisers use user profile information to target their message to an audience believed to be more receptive to the content of the message.

Advertisers in particular have attempted to leverage the profile information provided by users by targeting their ads to users whose interests best align with the products or services being advertised. For example, an advertiser using a social networking system may display banner ads for wedding locations to users who have updated their profile to indicate a change in marital status. However, targeting advertising to users is not very effective when the users' profiles are inaccurate or incomplete, which may occur because the profile information is supplied by the user and not verified for accuracy. Thus, in the above example, an advertiser may send promotional material or advertisements to a user who is married, but nontheeless has not reported as being married within the social networking system.

Even if a user profile is accurate, relevant advertisements often reach the intended recipient too late. Users of a social networking system generally do not update their profile information to reflect an event until after the event has occurred. Thus, in the above example, a user who got married may not update the new marital status on the social networking system until after the marriage. Consequently, an advertiser seeking to promote a wedding venue and relying on a user profile update will not reach the user until after the user likely has no need for a wedding venue.

An advertiser may try to predict that a user will get married at a future time if the user's profile indicates that the user is engaged. However, this system of prediction is unreliable because, as stated above, users do not update their profile very frequently and the profile information may not be accurate. Thus an advertiser could spend money to reach a user on a social networking system without reaching its target audience.

A social networking system and its users also rely on user provided profile information to communicate and interact with each user. A social networking system often uses user profile information to suggest friends or groups that may be of particular interest to each user. However, a social networking system and its users face problems similar to those outlined above, such as timeliness and accuracy of user provided profile information. Certain information is time sensitive and relevant only before a particular event occurs. Since users typically do not update their profile information until after an event has occurred, social networking systems relying on a profile update to provide such time sensitive information are bound to deliver the information too late. Similarly, user provided profile information may be inaccurate, resulting in inaccurate or irrelevant information suggestions.

SUMMARY

To provide content to a user of the social networking system more effectively, and in a more timely fashion, it may be desirable to predict the user's needs or an upcoming change in the user's needs in a more accurate manner. Rather than merely relying on a user's timeliness and accuracy in updating his or her profile information, embodiments of the invention predict events associated with a user based on information available about the user and accessible by the social networking system. An event, for example, may be a change in marital status, a birthday, a new job, a birth of a child, a graduation, or a death of a person associated with the user, just to name a few. Beyond simple reliance on a change in user profile information, the described approach is better able to use all the information contained in the social networking system such as wall posts, instant messages, e-mail messages, etc., to determine whtheer a user has experienced such an event and/or to predict whtheer a user has an upcoming event in the future.

Predicting an event associated with a user may allow the social networking system to provide content to the user. Content may include information such an advertisement or a gift such as a service or a good, including virtual goods and real goods that may be available for free or for purchase. In one embodiment, the content is selected based on user's activity within the social networking system, such as the users' bookmarks, items in the user's wish-list or shopping cart etc. Additionally, the selected content may be displayed to friends of the users within the social networking system wherein the friends can send the content to the user. For example, the user's friend may send a virtual good available for free to the user within the social networking system. In another embodiment, the user's friend may purchase a displayed item as a gift for the user, wherein the purchased gift item may be sent to the user.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and mtheods illustrated herein may be employed without departing from the principles of the invention described herein.

DETAILED DESCRIPTION

Overview

A social networking system offers its users the ability to communicate and interact with other users of the system. In use, users join the social networking system and then add connections to a number of other users to whom they desire to be connected. As used herein, the term "friend" refers to any other user to whom a user has formed a connection, association, or relationship via the social networking system. Connections may be added explicitly by a user, for example, the user selecting a particular other user to be a friend, or automatically created by the social networking site based on common characteristics of the users (e.g., users who are alumni of the same educational institution). Connections in social networking systems are usually in both directions, but need not be, so the terms "user" and "friend" depend on the frame of reference. For example, if Bob and Joe are both users and connected to each other within the social networking system, Bob and Joe, both users, are also each other's friends. The connection between users may be a direct connection; however, some embodiments of a social networking system allow the connection to be indirect via one or more levels of connections. Also, the term friend need not require that users actually be friends in real life, (which would generally be the case when one of the users is a business or other entity); it simply implies a connection in the social networking system.

In addition to interactions with other users, the social networking system provides users with the ability to take actions on various types of items supported by the system. These items may include groups or networks (where "networks" here refer not to physical communication networks, but rather social networks of people) to which users of the social networking system may belong, events or calendar entries in which a user might be interested, computer-based applications that a user may use via the system, and transactions that allow users to buy or sell items via the system. These are just a few examples of the items upon which a user may act on a social networking system, and many others are possible.

Figure 1:
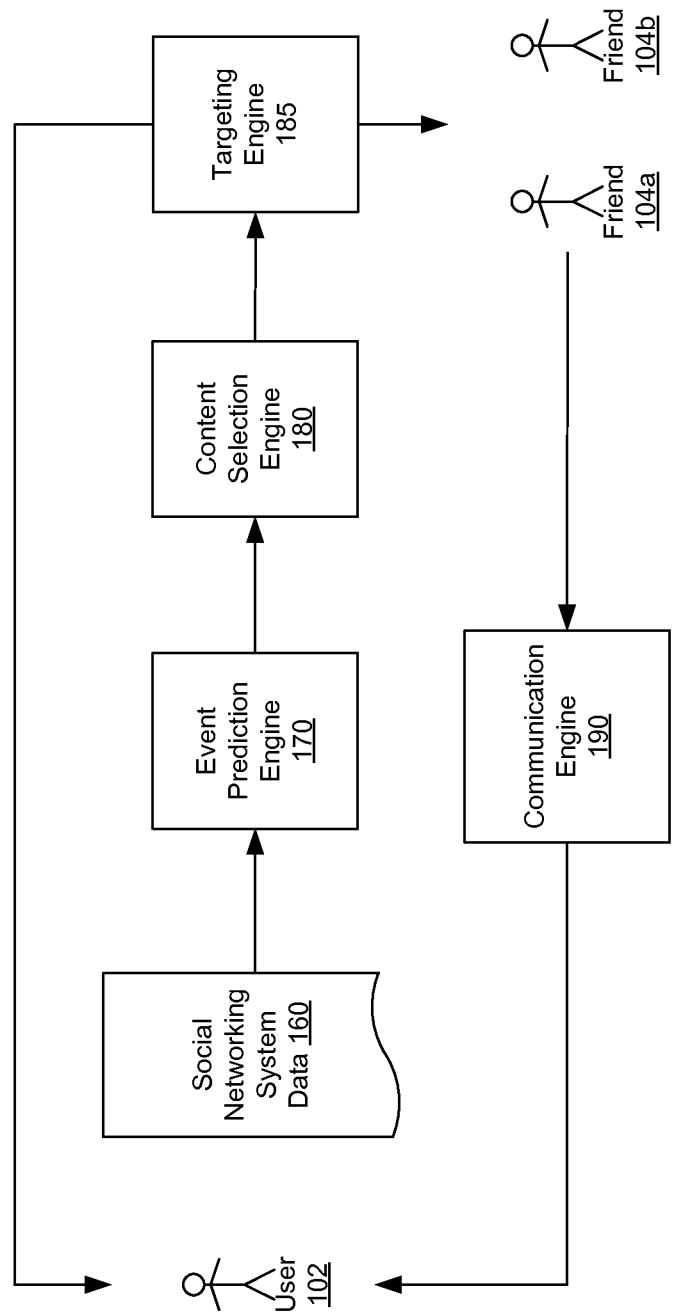
FIG. 1 is a diagram of a system for targeting content to social networking system users based on upcoming events associated with one or more users, in accordance with an embodiment of the invention.

FIG. 1 illustrates a system for targeting content to social networking system users based on upcoming events associated with one or more users. The system includes a user 102, his or her social networking system data, 160, an event prediction engine 170, a content selection engine 180, a targeting engine 185, a communication engine 195 and friends 104 of the user within the social networking system.

As described above, a social networking system user 102 is a person or an entity capable of interacting with one or more social networking system elements. In one embodiment, the user's social networking system activity may be recorded and included in social networking system data 160. The social networking system data 160 may include a social graph, wherein the user 102 and social networking system elements may be nodes and the user's activities or interactions with the elements may represent edges connecting the appropriate nodes.

In one embodiment, the event prediction engine 170 parses a user's social networking system data to identify any upcoming events associated with the user. Upcoming events may include events such as a birthday, graduation, wedding, engagement, etc., or plans that a user has made, such as going to a concert, a move, a play, etc. The event prediction engine 170 may predict such events based on the user's profile information or based on content of one or more messages send to or received by the user within the social networking system.

In one embodiment, the content selection engine 180 identifies content to provide to the user and the user's friends 104. The content selection engine accounts for a type of event predicted by the event prediction engine 170 and the user's interests. For example, a user who is predicted to graduate from college may be interested in content that may differ from a user who is predicted to get married. As such, the content selection engine 180 identifies content items appropriate to an event selected by the event prediction engine 170. Additionally, the content selection engine 180 may identify content items in a user's bookmarks, wish-lists and shopping carts to select those items or content related to those items. In one embodiment, the selected content is provided to the targeting engine 185.

The targeting engine 185 identifies social networking system users to display the content selected by the content selection engine 180. The social networking system users include the user 102 and the user's friends 104. In one embodiment, the targeting engine 185 selects one or more user's friends 104 if the friends are likely to send the displayed content to the user. In one embodiment, the targeting engine 185 determines that a friend is likely to send a content item to the user if the friend interacts frequently with the user 102, if the user has received content items from the user, etc. In one embodiment, the targeting engine 185 provides the selected content to the identified social networking system users.

In one embodiment, social networking system users, such as a user's friend 104 may decide to send the content provided by the targeting engine to the user 102. In such an instance, the communications engine 190 receives a request from a friend 104a and sends the content to the user 102. In certain instances, the selected content may include an item that the friend 104a has purchased as a gift for the user 102. In such an instance, the communication engine 190 sends a notification of the gift to the user within the social networking system. If the gift is a virtual good, the communication engine 190 may also send the virtual good to the user within the social networking system.

System Architecture

Figure 2:
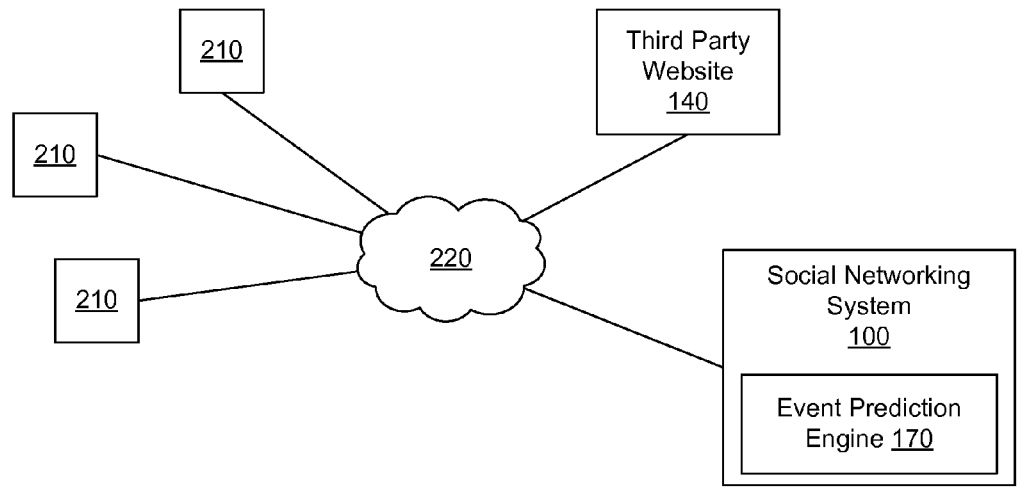
FIG. 2 is a network diagram of a system for targeting content to social networking system users based on upcoming events associated with one or more users, in accordance with an embodiment of the invention.

FIG. 2 is a high level block diagram illustrating a system environment suitable for operation of a social networking system 100. The system environment comprises one or more client devices 210, one or more third-party websites 140, a social networking system 100 comprising the event prediction engine 170, and a network 220. In alternative configurations, different and/or additional modules can be included in the system.

The client devices 210 comprise one or more computing devices that can receive user input and can transmit and receive data via the network 220. For example, the client devices 210 may be desktop computers, laptop computers, tablet computers (pads), smart phones, personal digital assistants (PDAs), or any other device including computing functionality and data communication capabilities. The client devices 220 are configured to communicate via network 220, which may comprise any combination of local area and/or wide area networks, using both wired and wireless communication systems. As described above, the third party websites 14 are coupled to the network 220 for communicating messages to the social networking system 100 about the users' actions off the system 100.

The social networking system 100 comprises a computing system that allows users to communicate or otherwise interact with each other and access content as described herein. In one embodiment, the social networking system 100 stores user profiles that describe the users of a social network, including biographic, demographic, and other types of descriptive information, such as work experience, educational history, hobbies or preferences, location, and the like. The system 100 further stores data describing one or more relationships between different users. The relationship information may indicate users who have similar or common work experience, group userships, hobbies, or educational history. Additionally, the social network permits users to submit user defined relationships between different users, allowing users to specify their relationships with other users. For example, these user defined relationships allows users to generate relationships with other users that parallel the users' real-life relationships, such as friends, co-workers, partners, and so forth. Users may select from predefined types of relationships, or define their own relationship types as needed.

Figure 3:
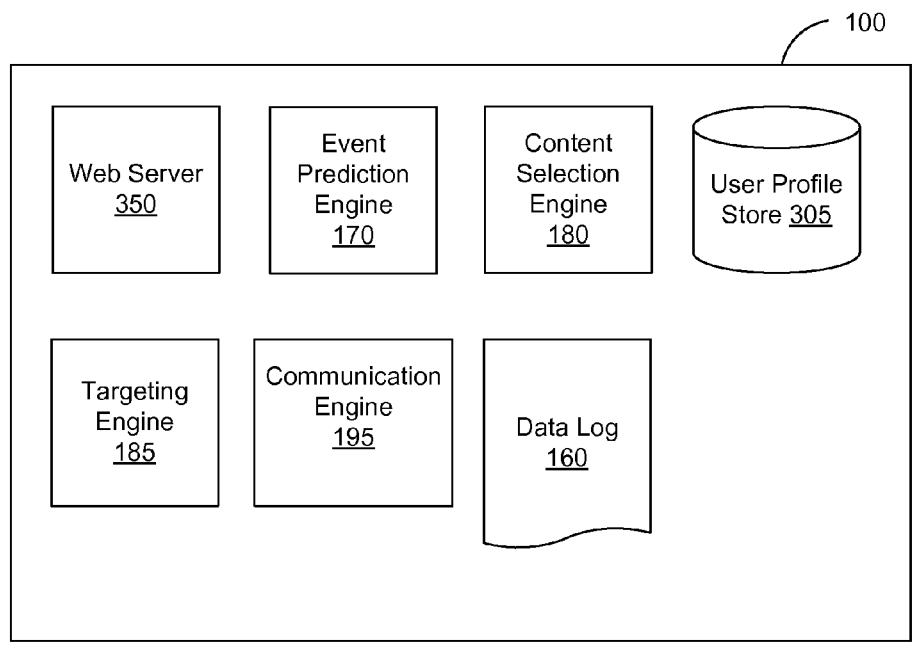
FIG. 3 is a block diagram of a social networking system, in accordance with an embodiment of the invention.

FIG. 3 is an example block diagram of a social networking system 100. The social networking system 100 includes a web server 350, a data log 160, a user profile store 305, an event prediction engine 170, a content selection engine 180, a targeting engine 185 and a communications engine 195. In other embodiments, the social networking system 100 may include additional, fewer, or different modules for various applications.

The web server 350 links the social networking system 100 via the network 220 to one or more client devices 210, as well as to one or more third party websites 140. The web server 350 may include a mail server or other messaging functionality for receiving and routing messages between the social networking system 100 and the client devices 210 or third party websites 140. The messages can be instant messages, queued messages (e.g., email), text and SMS messages, or any other suitable messaging technique.

The data log 160 is capable of receiving information about user actions on and/or off the social networking system 100. For example, the data log 160 may be populated with information about these user interactions with other users or objects of the social networking system 100. The types of actions that a user may perform in connection with an object are defined for each object and largely depend on the type of item represented by the object. A particular action may be associated with multiple objects. Described below are a number of examples of particular types of objects that may be defined for the social networking system, as well as a number of actions that can be taken for each object. These objects and the actions discussed herein are provided for illustration purposes only, and it can be appreciated that an unlimited number of variations and features can be provided on a social networking system.

In one embodiment, the social networking system maintains a user profile for each user of the system. Any action that a particular user takes with respect to another user is stored in the data log 106. Such actions may include, for example, adding a connection to the other user, sending a message to the other user, reading a message from the other user, viewing content associated with the other user, attending an event posted by another user, among others. In addition, a number of actions described below in connection with other objects are directed at particular users, so these actions are associated with those users as well.

A group may be defined for a group or network of users. For example, a user may define a group to be a fan club for a particular band. The system would maintain a group for that fan club, which might include information about the band, media content (e.g., songs or music videos) by the band, and discussion boards on which users of the group can comment about the band. Accordingly, user actions that are possible with respect to a group might include joining the group, viewing the content, listening to songs, watching videos, and posting a message on the discussion board.

Similarly, an event may be defined for a particular event created within the social networking system, such as a birthday party. A user may create the event by defining information about the event such as the time and place and a list of invitees. Other users may accept the invitation, comment about the event, post their own content (e.g., pictures from the event), and perform any other actions enabled by the social networking system for the event. Accordingly, the creator of the event as well as the invitees for the event may perform various actions that are associated with that.

The social networking system may also enable users to add applications to their profiles. These applications provide enhanced content and interactivity within the social networking system, which maintains an application object for each application hosted in the system. The applications may be provided by the system operator and/or by third party developers. An example application is an enhanced messaging service, in which users can send virtual objects (such as a "gift" or "flowers") and an optional message to another user. The use of any functionality offered by the application may thus constitute an action by the user in connection with the application. In addition, continuing the example from above, the receipt of the virtual gift or message may also be considered an action in connection with the application. It can therefore be appreciated that actions may be passive and need not require active participation by a user.

Another type of object within a social networking system may include a transaction object, which enables users to make transactions, such as buying, selling, renting, trading, or exchanging with other users. For example, a user may post a classified ad on the social networking system to sell a car. The user would thus define a new transaction, which may include a description of the car, a picture, and an asking price. Other users can then view this information and possibly interact further with the transaction by posting questions about the car and accepting the offer or making a counteroffer. Each of these interactions—view, question posting, offer, and counteroffer—are actions that are associated with the particular transaction.

In one embodiment, the social networking system also logs actions that a user takes on a third party website 140. The social networking system may learn of the user's actions on the third party website 140 via any of a number of mtheods.

For example, the third party website 140 may send a message to the social networking system when a particular action by a user occurs on the third party website 140. In one example, if the third party website 140 is a commercial website on which users may purchase items, the third party website 140 may inform the social networking system when a user of the social networking system buys an item on the third party website 140.

In another embodiment, the social networking system logs actions taken by its users in the real world by observing qualifying actions and populating the data log 160 with an entry describing the action. In one embodiment, the action to be tracked is a credit card transaction, where a user of the social networking system may optionally opt in by registering a credit card. When the registered credit card is used in a qualifying way (e.g., a purchase made at a point of sale), the credit card company (or clearinghouse) sends a message to the social networking system. In this scenario, a computing system at the credit card company or clearinghouse may provide the information to the social networking system 100 in a message. The message may contain information about the credit card transaction, such the item purchased, the date, and location of the purchase. The social networking system thus tracks real-world actions such as this purchase in the data log 160.

Another example illustrating real-world actions that may be tracked involves the user's location. A user may configure a cellular phone having location technology (e.g., GPS) to communicate the user's location to the social networking system. This may be accomplished, for example, by downloading an application to the cellular phone, where the application polls the location unit in the phone and sends a message containing the user's location to the social networking system. This may be performed periodically or upon certain triggering events associated with locations. For example, a triggering event can include the user being within to a specific city, or at particular destination such as a restaurant, business, or venue. In this application, the cellular phone (or other GPS-enabled device) provides the information to the social networking system 100.

Another example illustrating real-world actions that may be tracked involves what program material the user is accessing on a television system. A television and/or set-top receiver may transmit a message indicating that a user is viewing (or recording) a particular program on a particular channel at a particular time. Again, these examples are presented to illustrate some of the types of devices and actions that may be captured as actions by a user and communicated to the social networking system. A limitless variety of other applications may be implemented to capture real-world actions associated with a particular user and send that information to the social networking system.

When a user takes an action on or off the social networking system, the action is recorded in the data log 160. In one embodiment, the social networking system maintains the data log 160 as a database of entries. When an action is taken on or off the system, therefore, the social networking system adds an entry for that action to the log 160. In one embodiment, an entry comprises some or all of the following information:
Time: a timestamp of when the action occurred.
User: an identifier for the user who performed the action.
Target: an identifier for the user to whom the action was directed.
Action Type: an identifier for the type of action performed.
Object: an identifier for an object acted on by the action.
Content: content associated with the action.

It can be appreciated that many types of actions that are possible within the social networking system need not require all of this information. For example, if a user changes a picture associated with the user's profile, the action may be logged with just the user's identifier, an action type defining a picture change, and the picture or a link thereto as the content.

In one embodiment, the social networking system 100 generate a social graph that uses nodes to identify various objects and edges connecting nodes to identify relationships between different objects. An edge between two nodes in the social graph represents a particular kind of connection between the two nodes, which may result from an action that was performed by one of the nodes on the other node.

For example, if a first user establishes a connection with a second user in the social networking system, user profiles of the first user and the second users may act as nodes in the social graph. The connection between the first user and the second user may be stored as an edge between the nodes associated with the first user and the second user. Continuing this example, the second user may then send the first user a message within the social networking system 100, wherein the action of sending the message is another edge between the two nodes in the social graph representing the first user and the second user. Additionally, the message itself may be included in the social graph as another node connected to the nodes representing the first user and the second user After an amount of time, the data log 160 will become populated with a number of entries that describe actions taken by and communication associated with the users of the social networking system. The data log 160 thus contains a very rich set of data about the actions of the users, and can be analyzed and filtered to identify trends and relationships in the actions of the users, as well as affinities between the users and various objects. In one embodiment, the data log 160 can be analyzed to identify key words indicative of a event associated with the user 102.

The event prediction engine 170 predicts a event associated with a user of the social networking system. As described above in reference to FIG. 1, events comprise a change in marital status, relationship status, age, graduation status, employment statues, a change in the number of family users such as newborn or adopted children or siblings or death of a person or a pet associated with the user. In one embodiment, the event prediction engine 170 computes the probability of a user undergoing a event using a machine learning model and historical data of other users of the social networking system who have went through events. In one embodiment, the machine learning model of the event prediction engine 170 is trained using the data logs 106 retrieved for each user, whtheer each user went through an event change and the type of event. The machine learning model can use several data points within the retrieved data as variables to generate a predictive algorithm. For example, the use of words such as "congratulations," presence of virtual gifts offered to the users, the number of times other users clicked on the user's profile, change in other profile information, such as a change in address or last name, the number of new friends or connections made within the social networking system etc. The event prediction engine uses the data log 160 of the first user as input signal to the event prediction engine 170. In one embodiment, the event prediction engine 170 outputs a probability score indicative of whtheer the user will undergo particular event based on historical data of other users. In one embodiment, the event prediction engine 170 classifies the user as going through an event change if the probability score of the user is higher than a threshold score provided by the social networking system. In another embodiment, event prediction engine 170 identifies words indicative of an event in the user communications data. The words can be provided by the social networking system. In such an embodiment, the event prediction engine assigns a high probability of an event change to the user whose communications data indicates a high incidence of the identified words.

The content selection engine 180 identifies content based on an event associated with a user and information about the user. In one embodiment, the content selection engine 180 identifies content that is related to an event associated with the user. For example, if an event associated with the user is the user's birthday, the content selection engine 180 identifies items that may be related to a birthday, such as advertisements offering discounts to users on their birthdays or content items associated with getting older, etc. Additionally, in one embodiment, the content selection engine 180 identifies items that a user may be interested in. In one embodiment, the content selection engine 180 parses information in the user's data log 160 to identify such items. For example, the content selection engine may identify certain user actions, such as bookmarking a webpage associated with a content item, liking a content item, adding an item in a wish-list or in a virtual shopping-cart, mentioning the item in a wall post, etc., as indicative of the user's interest in the item. Such items are selected by the content selection engine 180 to display to users of the social networking system. In another embodiment, the content selection engine 180 selects an advertisement advertising an item that the user may be interested in. Similarly, a voucher or a coupon for an item the user may be interested in may also be selected by the content selection engine 180. In one embodiment, the content selection engine 180 identifies content hosted on third-party websites outside the social networking system domain and selects those items to present to a user based on the user's predicted life event. Third-party website may include, for example AMAZON.COM, EBAY.COM, and other websites that host or offer to sell one or more items.

The targeting engine 185 identifies social networking system users to display the content selected by the content selection engine 180. In one embodiment, the targeting engine 185 displays the selected content items to the user. For example, if the selected content is an advertisement offering a discount to the user because of the event associated with the user, the targeting engine 185 provides the item to the user. On the other hand, if the selected content item is an item the user may want, the targeting engine 185 provides the content item to the user's friends 104, such that the user's friends may send the item to the user 102 on an event date provided by the event prediction engine 170. For example, if the event associated with a user is his or her birthday, and the item selected by the content selection engine is a virtual good that the user may enjoy, the targeting engine 185 sends a link to the user's friends such that the friends may send the virtual good as a gift to the user on his or her birthday.

In one embodiment, the targeting engine 185 sends a gift suggestion to one or more of the user's friends. The gift suggestion may identify the user, the event inferred for the user, and one or more items selected by the content selection engine 180. The items may be presented as an image that may be purchased or shared within the social networking system and/or may include a link to a website outside of the social networking system. The link may direct the user's friends to an external website where an item suggested as a gift may be purchased. Additionally, the gift suggestion may include an interface element with which the user's friends may share the gift suggestion with others or purchase a portion of the item displayed within the gift suggestion interface. Examples of the gift suggestion interface are described in greater detail with reference to FIGS. 5A and 5B.

If the user's friends provide instructions to send one or more content items to the user, the communications engine 195 sends the content item to the user. In an embodiment wherein the user's friends may have to purchase an item as a gift for the user, the communications engine 195 facilitates the purchase of the item. In another instances, wherein the user's friends want to pool a contribution to towards a purchase of an item, the communications engine 195 may display the amount remaining to purchase an item as a gift to the user. Once the purchase is complete, the communications engine 195 sends the gift to the user.

Targeting Content to Users of the Social Networking System

Figure 4:
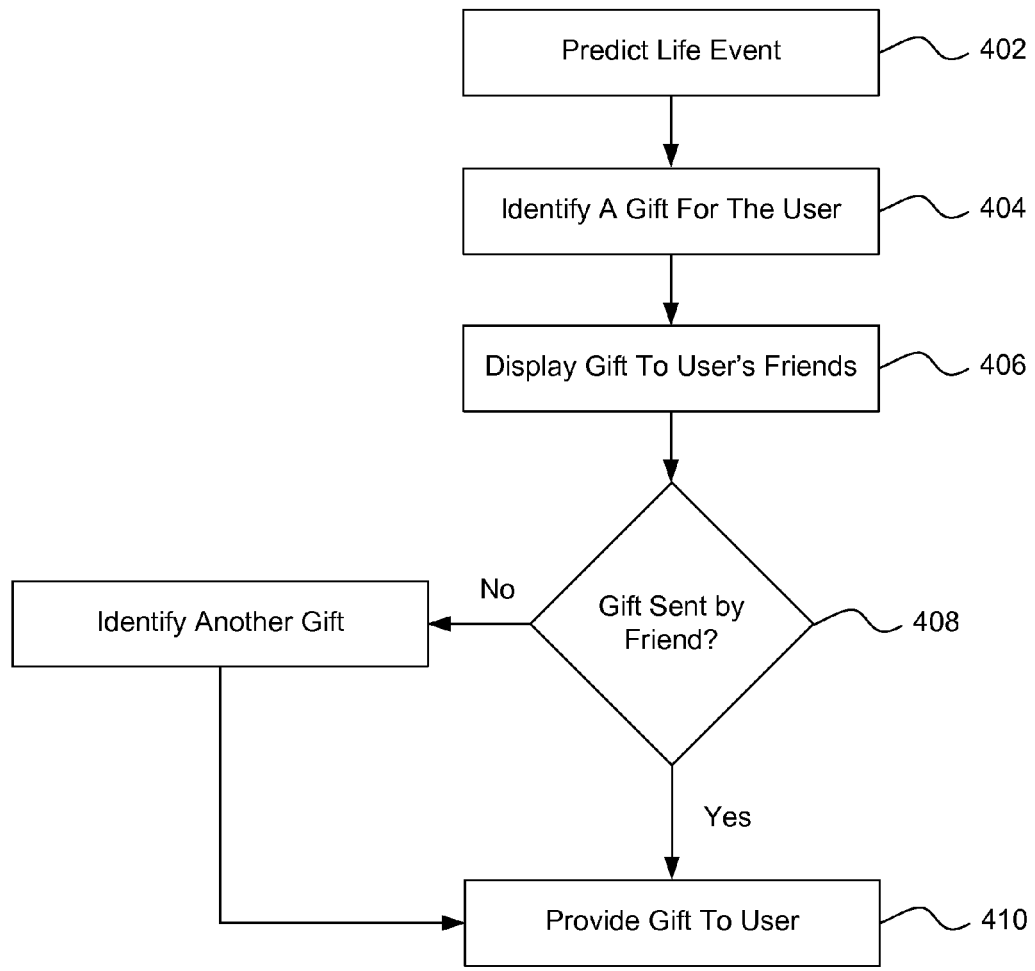
FIG. 4 is a flow chart of a process for targeting content to social networking system users based on upcoming events associated with one or more users, in accordance with an embodiment of the invention.

FIG. 4 illustrates a process in which the social networking system predicts a event for a user of the social networking system. In one embodiment, the social networking system executes the method illustrated in FIG. 4 for all users of the social networking system. In another embodiment, the process of FIG. 4 is executed for users whose profile information has changed.

The process 400 generates 402 a training set used to train a machine learning model. The process 400 identifies one or more users within the social networking system who have undergone a event. For example, if a user profile shows that the user changed marital status information, employment information or home address information, the process 400 identifies the user. Additionally the process 400 retrieves communications data and social network data performed by the user or other users in association with the user. In such an embodiment, the process 400 can retrieve communications and action data for a particular time period before the event is recorded on the user profile. For example, the process 400 can retrieve data from a week or a month prior to the event. In another embodiment, time frame and duration of the retrieved data can vary based on the event indicated by the user. The process 400 can retrieve communications and action data from a month prior to a marital status change, whereas the process 400 can retrieve communications and action data from two days prior to a change in age.

In one embodiment, the process 400 removes or discounts events that occur on particular dates. For example, the social networking system can provide that change in relationship status on April first is not a reliable indicator of the event. In such an embodiment, the process 400 removes the user data associated with such users. Additionally, the process generates 402 a training data based on the retrieved data, whtheer the user went through a event and type of event.

The process 400 computes 404 the probability of a user undergoing a event based on the user's communications and actions within the social networking system and the training data set. In one embodiment, the process 400 trains a machine learning model using the training data. The machine learning model can take into several factors in generating a prediction algorithm, such as the words comprising communications associated with the user, the length of the communication, the frequency of the communication, the type of actions taken, such as receiving virtual gifts from other users, creating an event corresponding to the event date, etc. Responsive to the training set, the machine learning model generates a prediction algorithm. Once the process 400 inputs communication and action data associated with the user the machine learning model uses the prediction algorithm to compute 404 the probability of a user undergoing a particular event. Additionally, if the user's probability score is above a provided threshold score, the user is predicted to go through a event.

The process updates 406 the user profile responsive to the prediction that the user will go through a event. In one embodiment, the process updates 406 the user profile such that the updated information is not available to the user or other users of the social networking system. In another embodiment, the user profile can be updated by adding a value to the user profile store 305.

The process provides 408 items to the user responsive to the prediction that the user will go through an event. In one embodiment, the process provides 408 virtual goods or gifts to the user based on the predicted event. For example, if the user is predicted to get married, the process can provide 408 a virtual wedding gift to the user. In another embodiment, the process can provide 408 advertisements to the user based on the predicted event and the advertiser provided targeting criteria for the advertisement. For example, if an advertiser provides that an advertisement should only be served to users who will get married, the process provides 408 the advertisement to users who are predicted to get married. In another embodiment, the process provides 408 the items to users of the social networking system associated with the user predicted to go through a event. For example, the process 408 can provide links to virtual wedding gifts to other users, wherein the other users can select and send the virtual gift to the user predicted to get married. In another embodiment, the process serves 408 advertisements to users associated with the user predicted to go through a event based on advertisement criteria. For example if an advertiser provides friends of a user predicted to get married should be targeted with a particular advertisement, the user process provides 408 the advertisement to the friends or users associated with the user predicted to get married.

Figure 5A:
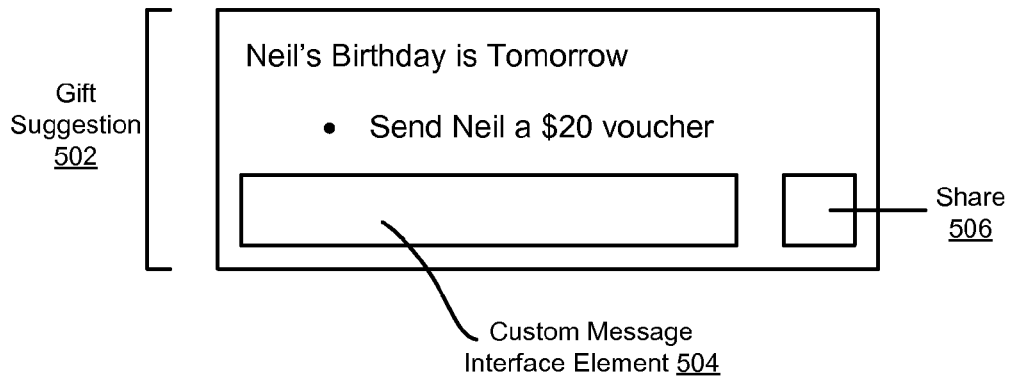
FIG. 5A illustrates a user interface displaying a gift suggestion based on an upcoming event inferred by the social networking system, in accordance with an embodiment of the invention.

FIG. 5A illustrates an interface for providing a gift suggestion based on an event inferred for a target user, according to one embodiment of the invention. FIG. 5A illustrates a gift suggestion 502 including text identifying an inferred life event, such as a birthday, a name of the target user, and an identification of the gift suggestion determined by the social networking system. In one embodiment, the gift suggestion 502 also includes a user interface element 504 wherein the viewing user may add a custom message and a user interface element 506 enabling the viewing user to share the gift item provided in the gift suggestion 502 with the target user.

Figure 5B:
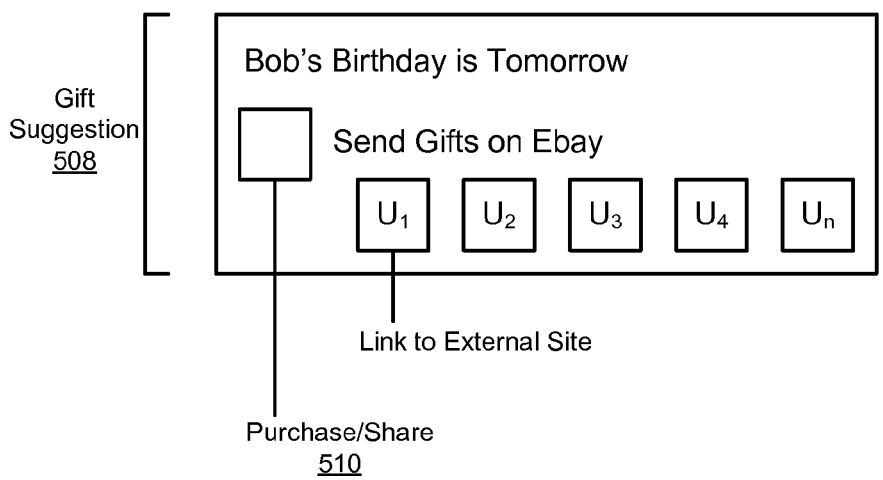
FIG. 5B illustrates a user interface displaying links to gift suggestions based on an upcoming event inferred by the social networking system, in accordance with an embodiment of the invention.

FIG. 5B illustrates an interface for providing a gift suggestion based on an event inferred for a target user, in accordance with another embodiment of the invention. FIG. 5B illustrates a gift suggestion 508 including text identifying an event inferred by the social networking system and a domain wherein a viewing user may purchase a gift to give to the targeting user. The gift suggestion 508 may include one or more links to an external site, wherein each link is for a gift item that the targeting user may be interested in. In other words, each gift item identified by the social networking system may be provided to the viewing user as a link within the gift suggestion 508. The gift suggestion 508 interface may also include an interface element 510 enabling a viewing user to share the gift suggestion 508 with other users of the social networking system who may also be interesting in purchasing a gift for the target user.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
inferring a life event for a target user of a social networking system based on one or more communications between the target user and one or more other users of the social networking system;
determining, by a computer processor, a gift suggestion based on the inferred life event for the target user, the gift suggestion for a gift that can be provided to the target user;
sending the gift suggestion with a notification about the inferred life event to one or more users with whom the target user has established a connection in the social networking system.

2. The method of claim 1, wherein the inferred life event comprises a change in marital status, a change in relationship status, a birthday, a change in employment status, a graduation, a change in health status, an addition of a new child, or death of a person associated with the target user.

3. The method of claim 1, wherein the gift associated with the gift suggestion is determined based on at least one of: an item in the target user's wish list, an item placed in a shopping cart by the target user, and a bookmark for a webpage provided by the user and stored within the social networking system.

4. The method of claim 1, wherein the gift suggestion includes a link to a merchant site to purchase an item.

5. The method of claim 1, wherein the gift suggestion includes multiple links, each link associated with a web page to buy an item for the target user.

6. The method of claim 1, wherein the gift suggestion comprises an advertisement for an item associated with the gift suggestion.

7. The method of claim 1, wherein the gift suggestion comprises a discount offer for an item associated with the gift suggestion.

8. The method of claim 1, wherein the gift suggestion comprises a user interface permitting a user of the social networking system to share the gift suggestion with other users of the social networking system with whom the target user has established a connection in the social networking system.

9. The method of claim 1, wherein the gift suggestion comprises a voucher enabling a user of the social networking system to send the voucher to the target user, the voucher for an item associated with the gift suggestion.

10. The method of claim 1, wherein the gift suggestion is sent to a plurality of users with whom the target user has established a connection in the social networking system.

11. The method of claim 1, wherein the gift suggestion provides an interface for purchasing a portion of a gift for the target user.

12. The method of claim 1, wherein inferring the life event for the target user comprises:
training a machine learning model using historical data related to communications involving the one or more other users of the social networking system and confirmations about life events for the one or more other users of the social networking system; and
inferring the life event for the target user using the trained machine learning model.

13. A computer program product comprising a non-transitory computer-readable storage medium containing computer program code for:
inferring a life event for a target user of a social networking system based on one or more communications between the target user and one or more other users of the social networking system;
determining a gift suggestion based on the inferred life event for the target user, the gift suggestion for a gift that can be provided to the target user;
sending the gift suggestion with a notification about the inferred life event to one or more users with whom the target user has established a connection in the social networking system.

14. The computer program product of claim 13, wherein inferring the life event for the target user comprises:
training a machine learning model using historical data related to communications involving the one or more other users of the social networking system and confirmations about the life event for the one or more other users of the social networking system; and
inferring the life event for the target user using the trained machine learning model.

15. The computer program product of claim 14, wherein the inferred life event comprises a change in marital status, a change in relationship status, a birthday, a change in employment status, a graduation, a change in health status, an addition of a new child, or death of a person associated with the target user.

16. The computer program product of claim 14, wherein the gift associated with the gift suggestion is determined based on at least one of: an item in the target user's wish list, an item placed in a shopping cart by the target user, and a bookmark for a webpage provided by the user and stored within the social networking system.

17. The computer program product of claim 14, wherein the gift suggestion comprises a user interface permitting a user of the social networking system to share the gift suggestion with other users of the social networking system with whom the target user has established a connection in the social networking system.

18. The computer program product of claim 14, wherein the gift suggestion comprises a voucher enabling a user of the social networking system to send the voucher to the target user, the voucher for an item associated with the gift suggestion.

19. The computer program product of claim 14, wherein the gift suggestion is sent to one or more users with whom the target user has established a connection in the social networking system.

20. The computer program product of claim 14, wherein the gift suggestion provides an interface for purchasing a portion of a gift for the target user.

21. The method of claim 1, wherein the gift comprises a service, a good, both virtual and real, an item, a voucher or any combination thereof.

22. The computer program product of claim 14, wherein the gift comprises a service, a good, both virtual and real, an item, a voucher or any combination thereof.

* * * * *